United States Patent [19]

Oosterbaan

[11] 4,433,388

[45] Feb. 21, 1984

[54] LONGITUDINAL PARITY

[75] Inventor: DuWayne D. Oosterbaan, Escondido, Calif.

[73] Assignee: NCR Corporation, Dayton, Ohio

[21] Appl. No.: 194,633

[22] Filed: Oct. 6, 1980

[51] Int. Cl.³ ............................................. G06F 11/00
[52] U.S. Cl. .................................. 364/900; 365/200; 371/49
[58] Field of Search ... 364/200 MS File, 900 MS File; 371/49-51, 38, 21; 365/200-202

[56] References Cited

U.S. PATENT DOCUMENTS

| | | | |
|---|---|---|---|
| 3,814,921 | 6/1974 | Nibby et al. | |
| 3,838,264 | 9/1974 | Maker | 371/21 |
| 3,887,901 | 6/1975 | Moore | 371/51 |
| 4,016,409 | 5/1977 | Kim | 371/51 |
| 4,038,537 | 7/1977 | Cassarino, Jr. et al. | 371/51 |
| 4,044,328 | 8/1977 | Herff | 371/50 |
| 4,155,070 | 5/1979 | Munter | 371/49 |
| 4,168,486 | 9/1979 | Legory | |
| 4,234,955 | 11/1980 | Jerimiah et al. | |
| 4,282,584 | 8/1981 | Brown et al. | 364/900 |
| 4,303,993 | 12/1981 | Panepinto et al. | 365/230 |
| 4,304,002 | 12/1981 | Hunt | 371/49 |
| 4,335,459 | 6/1982 | Miller | 371/38 |
| 4,339,804 | 7/1982 | Davidson et al. | 364/900 |
| 4,344,155 | 8/1982 | Mollier | 365/200 |
| 4,354,251 | 10/1982 | Hellwig et al. | 364/900 |
| 4,355,393 | 10/1982 | Kubo et al. | 371/51 |
| 4,368,532 | 1/1983 | Imazeki et al. | 371/21 |
| 4,371,963 | 2/1983 | Edwards, Jr. et al. | 371/50 |
| 4,388,684 | 6/1983 | Nibby, Jr. et al. | 364/200 |

OTHER PUBLICATIONS

D. W. Grimes, Address Error Checker for Remote and Local Scattered Bits, IBM Tech. Discl. Bull., V. 22, pp. 456-457.
R. E. Vogelberg, Maintaining Parity in Memory Modules, IBM TDB, V. 24, pp. 4623-4624.
C. V. Freiman, Longitudinal Checks Using Transverse Parity, IBM TDB, V. 6, pp. 2-3.
R. Vierson et al., Memory Parity Checking, Xerox Disclosure Bulletin, V. 1, p. 79.
A. R. Barsness, W. H. Cochran, W. A. Lopour, & L. P. Segar, Longitudinal Parity Generation for Single-Bit Error Correction, IBM Tech. Disclos. Bulletin, vol. 24, No. 6, Nov. 1981, pp. 2769-2770.
R. H. Linton, Detection of Single Bit Failures in Memories Using Longitudinal Parity.
IBM TDB, V. 22, Hodges, 7/79, p. 336
IBM TDB, V. 21, Gladstein, 6/78, p. 256.

*Primary Examiner*—James D. Thomas
*Assistant Examiner*—Archie E. Williams, Jr.
*Attorney, Agent, or Firm*—Stephen F. Jewett; Robert L. Clark

[57] ABSTRACT

A memory system has a plurality of memory modules. A longitudinal parity word is stored in one memory module and correction words are stored in each of the other memory modules. When one of the data words in a memory module having a correction word is changed, the correction word is also changed from a prior value to a new value so that the longitudinal parity of the data in the modules is unaffected. The new value of the correction word is computed by EXCLUSIVE ORing the value of the data word before the change, the data word after the change, and the prior value of the correction word.

9 Claims, 5 Drawing Figures

LONGITUDINAL PARITY

BACKGROUND OF THE INVENTION

The present invention relates to data processing systems and, more particularly, to memory systems used in data processing systems, where such memory systems employ longitudinal parity bits for checking data.

The use of parity bits to check and correct binary data stored in memory systems is well known in the art. Two "types" of parity bits are often employed, with one type commonly referred to as "horizontal" parity bits and the other type commonly referred to as "longitudinal" parity bits. A horizontal parity bit is generated by logically combining the bits in an individual data word. The horizontal parity bit is stored in memory with the data word, and the validity of the data word can later be checked by again logically combining the bits in the data word and comparing the result with the stored horizontal parity bit.

A longitudinal parity bit, on the other hand, is generated by logically combining a column of bits, i.e., bits in the corresponding bit location of each of a plurality of data words, so that when a plurality of words are stored in memory, a longitudinal parity word having the same number of bits as each data word may be stored and used to check for an error somewhere in the memory.

In some systems, where sufficient memory space is available for storing parity bits, data correction is achieved by checking both horizontal parity and longitudinal parity. In such systems, horizontal parity indicates the data word where an error has occurred, and longitudinal parity indicates the particular column or bit location of the error in the data word.

When longitudinal parity is used, either alone or in conjunction with horizontal parity, some difficulties arise when the memory is comprised of a plurality of memory modules. In such a case, the longitudinal parity word generated by logically combining bits in all of the data words is stored in only one of the modules. In particular, when a memory comprises read-only memory (ROM) modules, as is the case in many data processing systems having stored microprograms and control routines, and when a particular data word in the memory needs to be changed in order to update the memory, both the memory module having the data word to be changed and the memory module having the stored longitudinal parity word must be removed and replaced with new modules having updated words. Requiring the replacement of two modules significantly adds to the cost of maintaining such systems.

SUMMARY OF THE INVENTION

There is provided, in accordance with the present invention, a data processing system having a memory that stores at least two groups of data. Each group of data is stored in a separate memory module. The memory also stores parity information or bits computed by logically combining all the groups of data and correction information or bits associated with at least one of the groups of data. When the group of data associated with the correction information is changed or updated, the correction information is also changed so that the parity information is unaffected and can remain unchanged.

In particular, there is provided a data processing system having a memory system that comprises plural memory modules, each module storing a group of data or data words. A parity word is computed by logically combining, using an EXCLUSIVE OR function, the bits of all the data words stored in the memory modules and is stored at a memory address location in one of the memory modules. In order to permit changing or replacement of one of the memory modules in order to update a data word therein, without also requiring replacement of the memory module storing the parity word, there is provided a memory address location within each memory module, other than the memory module storing the parity word, that stores a correction word. The correction word in each memory module has its bits set at an initial value. When the data word in one of the memory modules is changed, the correction word in that same memory module has its initial value also changed to a counterbalancing value so that the stored parity word remains unaffected by the changed data word.

In the preferred embodiment, a memory system is provided having a plurality of read-only memory modules. A longitudinal parity word is stored in one of the memory modules, and a correction word is stored in each of the other memory modules. The correction words are each set at an initial value with all bits at binary zero. When a data word in any one of the memory modules is updated or changed, the correction word in that same memory module is also changed.

The new or changed correction word is computed for the memory module by logically combining, using an EXCLUSIVE OR function, corresponding bits of (1) the changed data word before the change, (2) the changed data word after the change, and (3) the old or prior correction word in the memory module. The result is stored as the new correction word. The new correction word offsets or counterbalances the updated data word, so that the bits in the longitudinal parity word can remain at their original value.

It should be apparent from the foregoing that by providing a correction word in the memory modules as described above, the longitudinal parity word can always be kept at a constant value, unless a data word within its own memory module is changed. As a result, if a memory module other than the module having the longitudinal parity word needs to have a data word updated, only that memory module needs to be physically removed and replaced or reprogrammed.

It is therefore an object of the present invention to provide an improved memory system.

It is another object of the present invention to provide an improved memory system employing longitudinal parity.

Still a further object of the present invention is to provide a memory system having a plurality of memory modules and storing a longitudinal parity word in one of the modules, where updating a data word in one memory module will not automatically require updating the memory module having the longitudinal parity word.

These and other objects of the present invention will become more apparent when taken in conjunction with the following description and the attached drawings.

DETAILED DESCRIPTION OF THE PREFERRED EMBODIMENT

Figure 1:
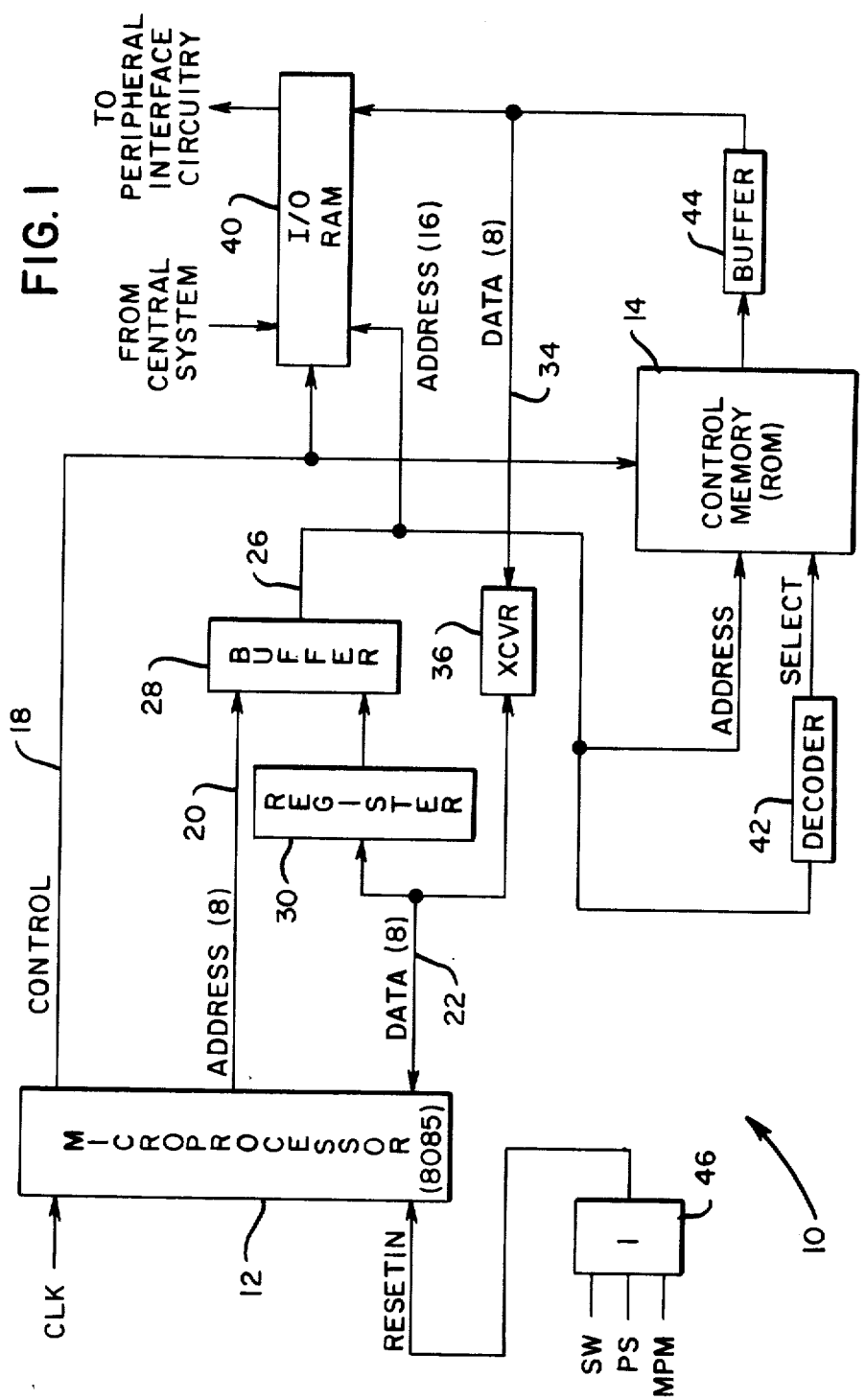
FIG. 1 is a simplified block diagram of a control processor having a control memory in accordance with the present invention.

Referring now to FIG. 1, there is shown in simplified form a control processor 10 of a data processing system. The control processor 10 has a microprocessor 12 that is operated in accordance with a control routine or program stored in a control memory 14. As indicated in the drawings, the microprocessor 12 may be an 8085 single-chip microprocessor, commercially available from Intel Corporation, Santa Clara, Calif., and is synchronized by a clock signal CLK. The microprocessor 12 has its control output terminals connected to control lines 18, its address output terminals connected to address lines 20, and its bi-directional data terminals connected to data lines 22.

As is conventional in the use of an Intel 8085 microprocessor, sixteen bit addresses are provided by multiplexing the address lines 20 and the data lines 22. Accordingly, an address bus 26 is connected for receiving sixteen address bits from a buffer 28, which in turn receives eight bits at one set of inputs from the address lines 20 and receives eight bits at its other set of inputs from the data lines 22 by way of a register 30. The data lines 22 are also connected to an eight bit bi-directional data bus 34 by way of a transceiver 36, so that the microprocessor 12 can both provide and receive data bits.

In the illustrated embodiment, the control processor 10 controls a peripheral device, such as a disc unit (not shown), in a data processing system. Accordingly, the control lines 18, the address bus 26, and the data bus 34 are, in addition to being connected to control memory 14, also connected to an input/output (I/O) random access memory (RAM) 40. The RAM 40 receives data from the central processor or system (not shown) of the data processing system. Such data received by the RAM 40 is in the form of macrocommands, specifying to the control processor 10 the desired operation (such as read or write) sought by the central system. In response, the control processor 10 generates primitive commands that are stored in the RAM 40 and later provided to interface circuitry (not shown) associated with the peripheral device, to control the operation of the peripheral device.

The control memory 14, as indicated in FIG. 1, is a read-only memory (ROM), and includes a plurality of ROM memory chips or modules.

The control memory 14 stores data in the form of control routines or programs for controlling the operation of the microprocessor 12, and provides instructions to the microprocessor 12 along the bi-directional data bus 34 in response to addresses received from the address bus 26. Address bits from the address bus 26 are provided to the address inputs of the memory modules within the control memory 14, and to a decoder 42 that selectively enables individual ones of the memory modules. The addressed instructions at the data output of the control memory 14 are provided to the data bus 34 by way of a buffer 44.

As is conventional, the microprocessor 12 can go into a diagnostic routine in order to check the validity of the data stored in the control memory 14. The control memory 14 stores, in a manner to be described in greater detail later, a longitudinal parity word and the microprocessor 12 checks the data in the control memory 14 by comparing the stored longitudinal parity word with a check sum generated by logically combining the data stored in the control memory 14. The diagnostic routine is initiated by a signal RESETIN, which is delivered to the microprocessor 12 from an OR gate 46. The OR gate 46 receives and is enabled at its output by any one of three signals SW, PS and MPM. The SW signal is provided at a switch (not shown) that, for example, can be manually set by a service technician. The PS signal is provided when the control processor 10 is first supplied with a power signal, for example, at the beginning of a work day. The MPM signal is provided from the central system of the data processing system, when the central system is first supplied with a power signal. When the diagnostic routine is initiated by the RESETIN signal, the microprocessor 12 causes the entire contents of the control memory 14 to be read, a check sum to be computed, and the check sum to be compared with the longitudinal parity word stored in the control memory 14.

The control processor 10 as thus far described is conventional. Accordingly, no further or more detailed description will be given of the microprocessor 12, the control, address, and data signals, or the specific commands or routines stored in the control memory 14 or in the RAM 40. The nature of these items is well known to those skilled in the art.

As is often the case in data processing systems, it may be occasionally desired that the control routine or program that controls the operation of control processor 10 of FIG. 1 be changed or updated. This may arise either because of the discovery, during diagnosis, of a defect in the program stored in the control memory 14, or because of the desire to provide the control memory with a new or updated program. In such a circumstance, it is necessary that the memory module in the control memory 14 having the specific instruction or instructions to be changed be physically removed from the control memory and be reprogrammed or replaced with a substitute module. This is due, of course, to the fact that the memory modules in the control memory 14 are read-only memories and cannot have data written into them during normal memory operation. Such types of memories are frequently employed in the control of processors, where an extremely fast transfer of data or instructions to a processor or microprocessor is necessary. In the preferred embodiment, the memory modules within the control memory 14 are each an erasable programmable read-only memory (EPROM), such as Circuit No. 2716, sold by Intel Corporation. However, in the practice of this aspect of the present invention, the memory module might be any type of memory that, during normal memory operation, cannot have new data written into its memory locations. Thus, as used herein, the term "read-only memory" includes not only standard read-only memories, but also programmable read-only memories (PROM's), read-mostly memories, and alterable read-only memories. In addition, it should be apparent to one skilled in the art that the present invention might, in some circumstances, also be useful in connection with read-write memories.

As mentioned earlier, the need to change a specific instruction or data word in one of the memory modules in the control memory 14 would, in the past, give rise to a problem in maintaining the longitudinal parity word stored in the control memory, since any change in data normally also changes the parity of the data and requires that the stored longitudinal parity word also be changed. However, as will be more particularly described hereinafter, the control memory 14 permits such a change of data in one of the modules without requiring that the module storing the parity word also be changed.

Figure 2:
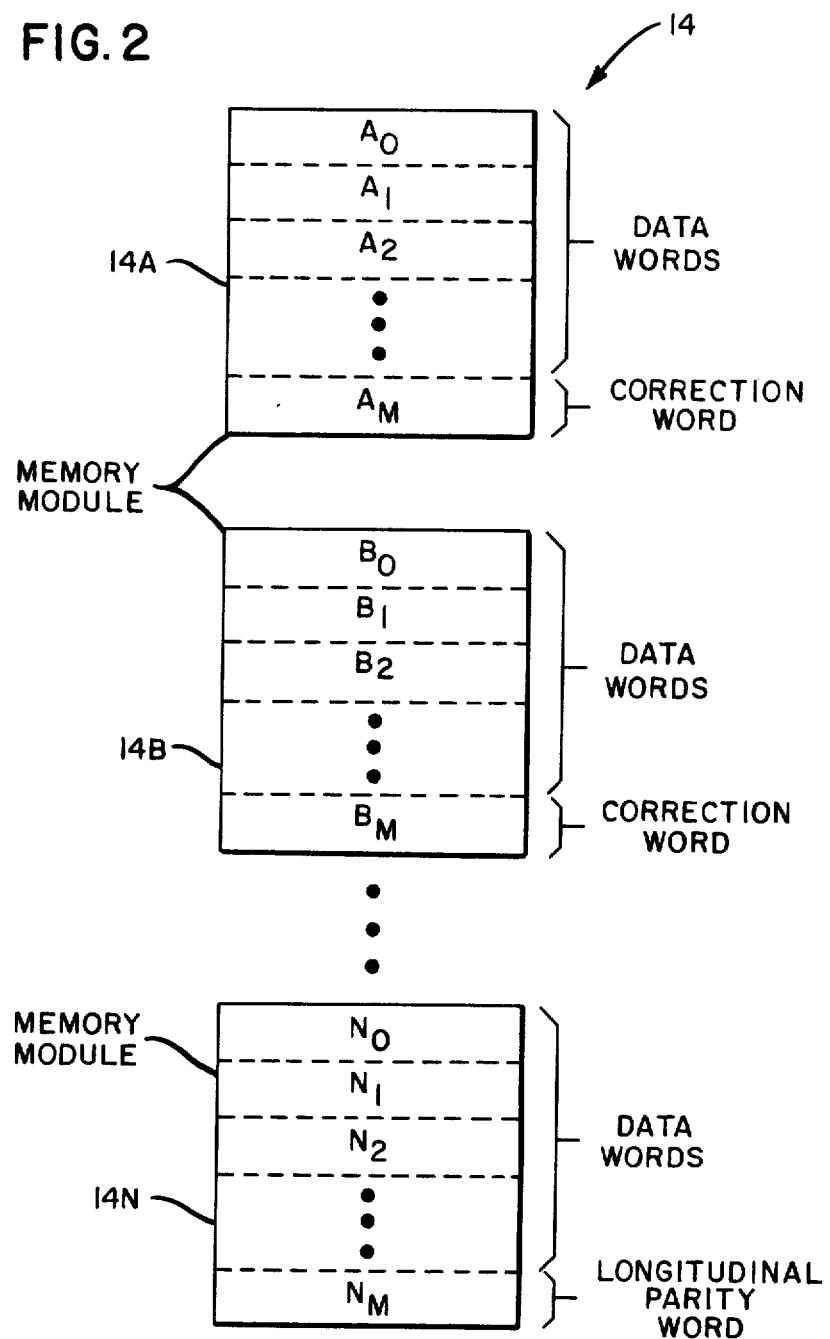
FIG. 2 is a block diagram showing the organization of the control memory in the processor of FIG. 1.

This feature of the control memory 14 is illustrated in FIG. 2, which shows the contents of each of the memory modules in the control memory 14. In particular, FIG. 2 shows the control memory 14 as including a plurality of memory modules 14A through 14N. Each memory module contains a plurality of memory locations, each for storing one data word. In memory module 14A, the memory locations are identified by their addresses $A_0$ through $A_M$, in memory module 14B the memory locations are identified by their addresses $B_0$ through $B_M$, and so forth, up to the last memory module 14N, where the memory locations are identified by their addresses $N_0$ through $N_M$. With the exception of memory module 14N, the last memory location of each module stores a correction word, and the remaining memory locations of each memory module store any desired data words. In the last memory memory module 14N, the last memory location $N_M$ stores a longitudinal parity word rather than a correction word, for reasons which will become apparent as the present description progresses.

In accordance with the present invention, each correction word is set at an initial value with all of its bits at zero, and the longitudinal parity word is computed, as is conventional, by EXCLUSIVE ORing corresponding bits of each of the data words in all of the memory modules. When a data word in one of the memory modules is to be changed, the correction word in that memory module is also changed so that the change in the correction word offsets the change in the data and so that the parity of the data, and the stored longitudinal parity word, remain unaffected. Of course, if the last memory module 14N is the memory module having the changed data word, then the longitudinal parity word in that memory module is correspondingly changed, without any affect on any other memory module.

In particular, when a data word or instruction in one of the memory modules 14A through 14N is changed, the new or updated correction word in that memory module is computed by EXCLUSIVE ORing corresponding bits of: (1) the value of the data word prior to the change, (2) the value of the data word after the change, and (3) the value of the correction word before the change. The result of this computation is stored as the new or updated correction word.

The reason for the computation as described above of the new correction word is shown by the following equations, beginning with the equation:

$$[\text{PARTIAL CHECK SUM}]_{before} = [\text{PARTIAL CHECK SUM}]_{after}.$$

This equation simply states the equality of the longitudinal parity that exists before and after a given data word is changed, and in particular applies to the partial check sum of each memory module that is used in computing the longitudinal parity word. A partial check sum is a computation arrived at by EXCLUSIVE ORing all the data words and the correction word of a memory module. The stored longitudinal parity word is, of course, equal to the sum (EXCLUSIVE ORing) of all the partial check sums, and in order for the longitudinal parity to remain unaffected by a data word change, the partial check sum of the module having the changed data word must remain unaffected.

If we look, for example, at the memory module 14A, the above equation becomes:

$$[A_0 \oplus A_1 \oplus A_2 \oplus \ldots A_{M-1} \oplus A_M]_{before} = [A_0 \oplus A_1 \oplus A_2 \oplus \ldots A_{M-1} \oplus A_M]_{after},$$

where the data words ($A_0$ through $A_{M-1}$) and the correction word ($A_M$) are represented by their memory addresses, and where the symbol $\oplus$ represents an EXCLUSIVE OR function.

By rearranging this equation for the memory module 14A, the following equation is obtained:

$$[A_0 \oplus A_1 \oplus A_2 \oplus \ldots A_{M-1}]_{before} \oplus [A_0 \oplus A_1 \oplus A_2 \oplus \ldots \oplus A_{M-1}]_{after} \oplus [A_M]_{before} = [A_M]_{after}$$

If, for example, only the data word at the address $A_1$ in memory module 14A is to be changed, and all the other data words remain the same, then the EXCLUSIVE OR function will cancel in the last equation all the data words except the changed data word, leaving:

$$[A_1]_{before} \oplus [A_1]_{after} \oplus [A_M]_{before} = [A_M]_{after}$$

It can thus be seen that the new value of the correction word at the address $A_M$ is computed by EXCLUSIVE ORing the value of the data word before the change, the value of the data word after the change, and the value of the old correction word before the change.

Of course, it should be apparent from the above equations that if more than a single data word is changed, the new correction word is obtained by EXCLUSIVE ORing the values of all the changed data words before the change, the values of all the changed data words after the change, and the value of the old correction word.

Figure 3A:
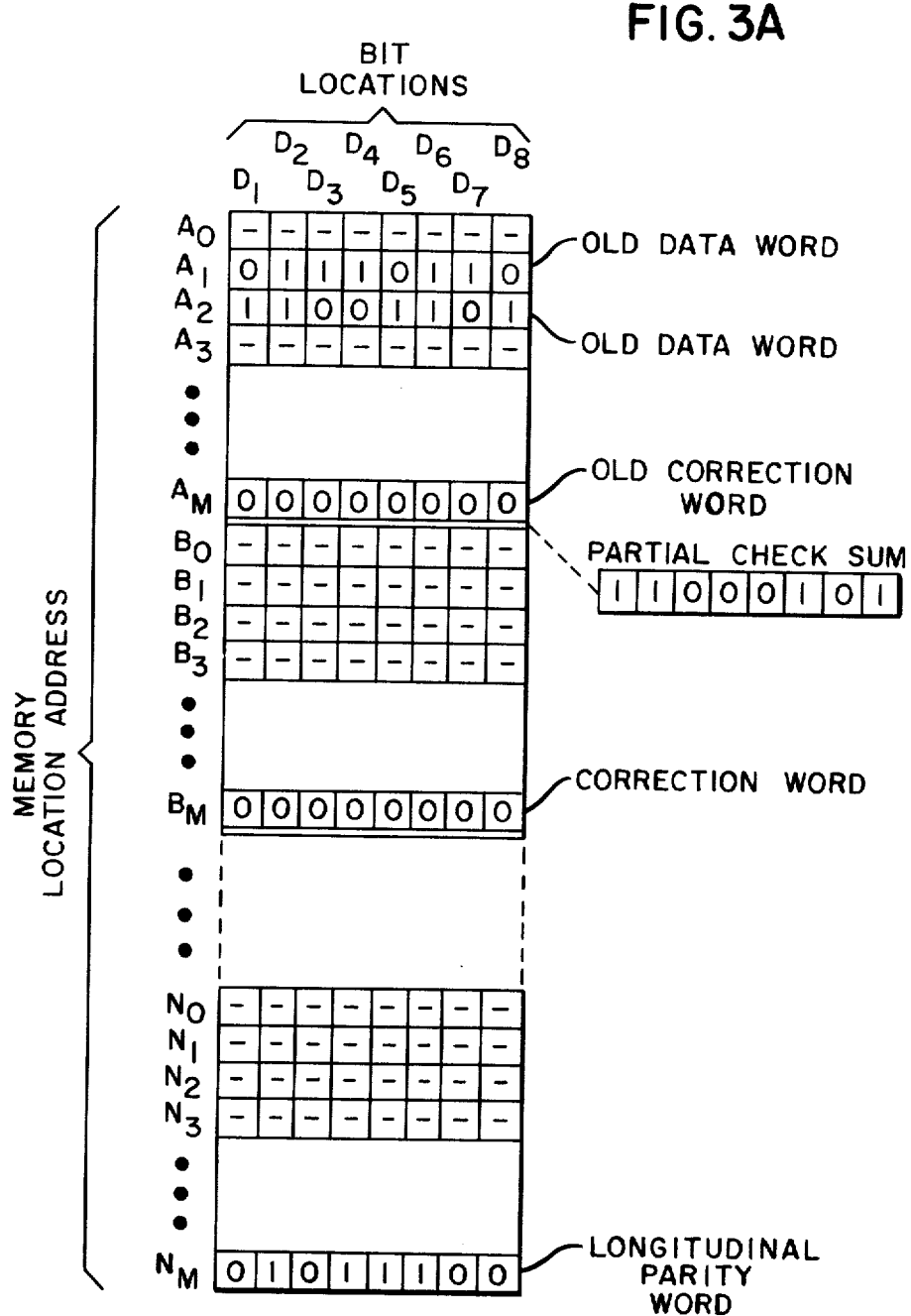
FIGS. 3A, 3B and 3C illustrate the content of the control memory of FIGS. 1 and 2, when data words in one of the memory modules of the control memory are changed.
Figure 3B:
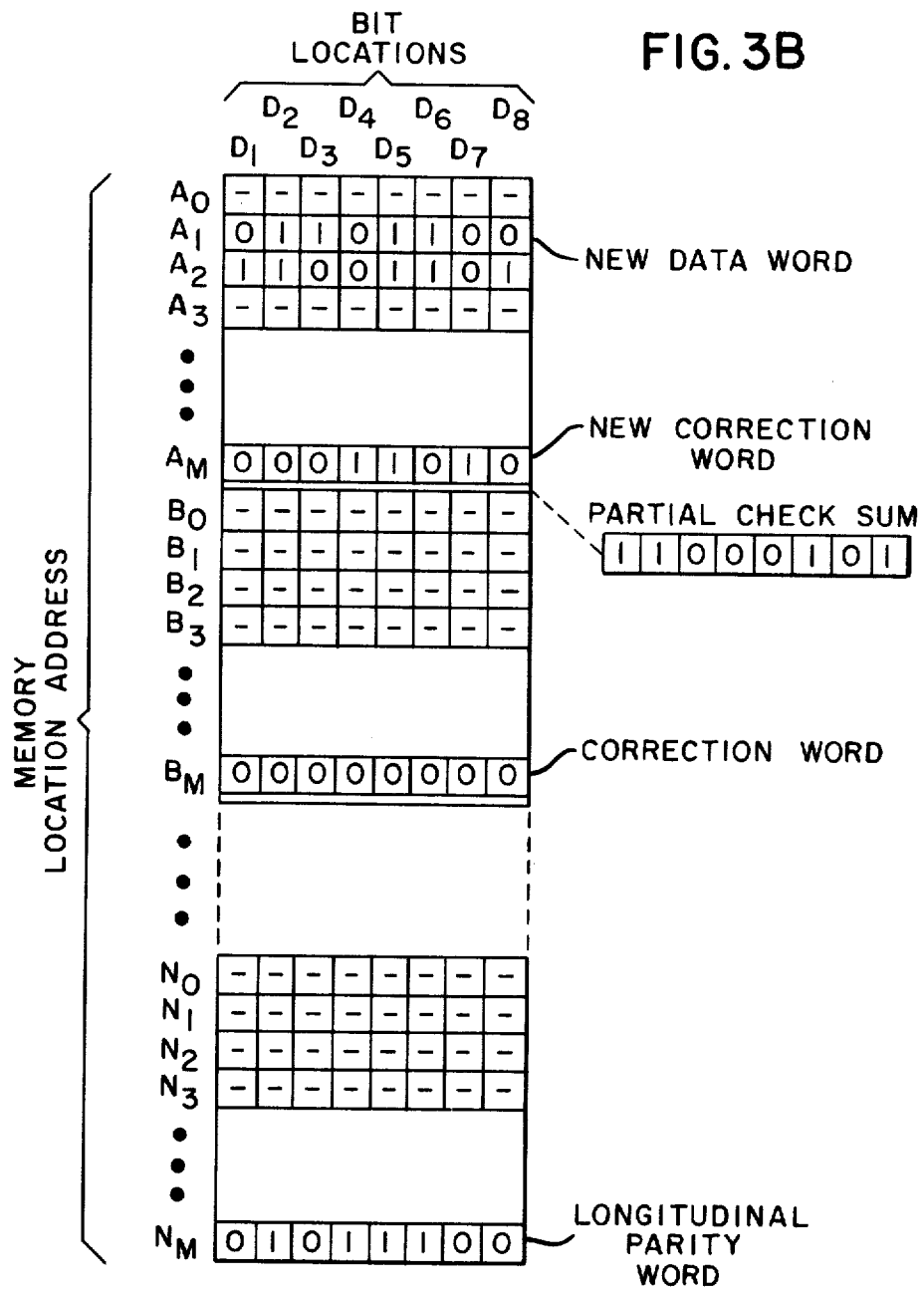
Figure 3C:
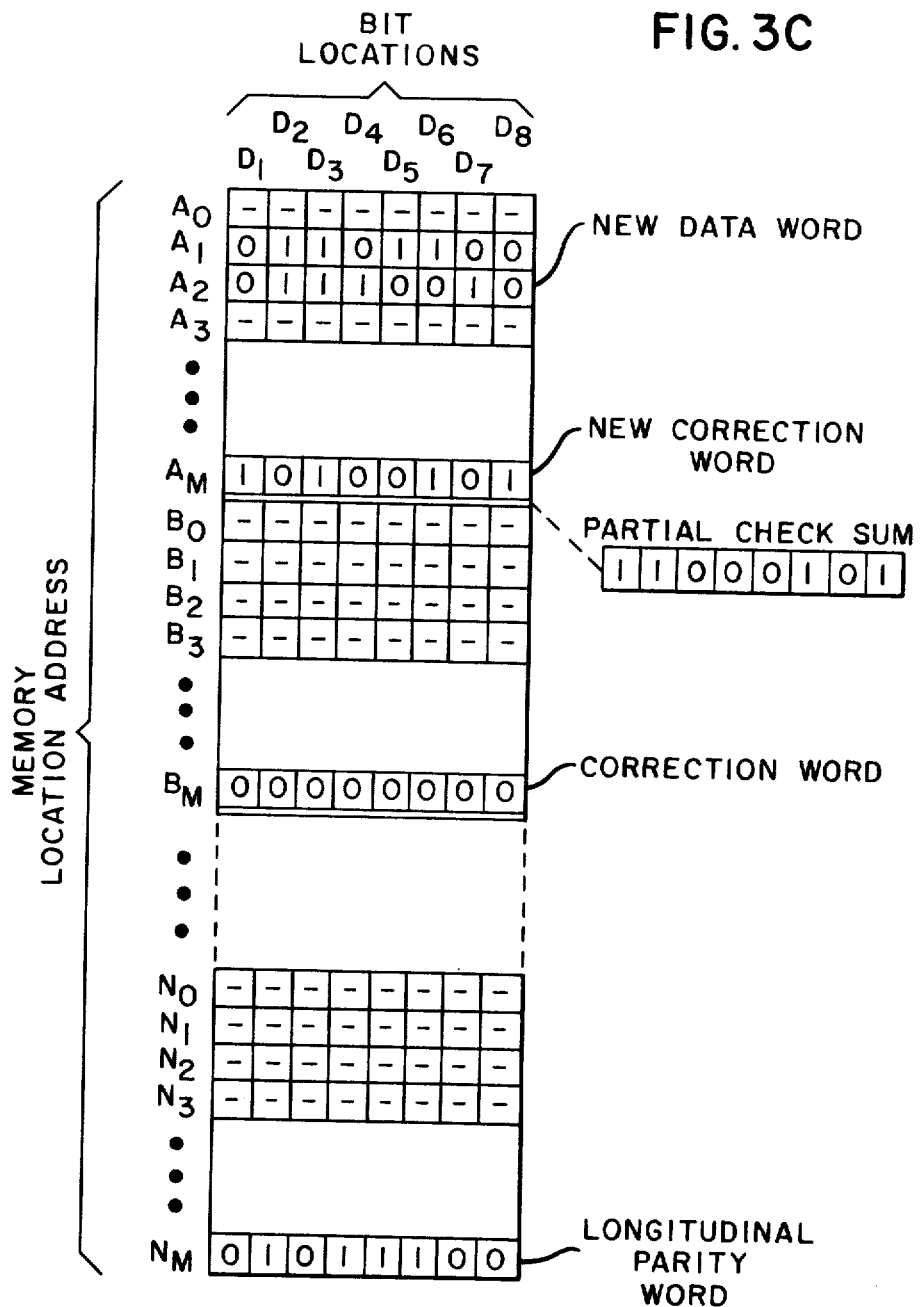

The manner in which correction words are changed in order to accommodate changes in data words is illustrated by example in FIGS. 3A, 3B, and 3C, which show values of data words, partial check sums, corrections words, and the longitudinal parity word stored in control memory 14. In FIG. 3A, there are shown the initial values of the correction words in the last memory locations $A_M$ and $B_M$ of memory modules 14A and 14B, respectively. In addition, the longitudinal parity word computed by logically combining all of the data in the memory modules is shown in the last address location $N_M$ of memory module 14N. For purposes of simplifying the present description, it is assumed that only the data words stored at addresses $A_1$ and $A_2$ of memory module 14A will be changed, with the old data word values shown in FIG. 3A. In addition, FIG. 3A shows the value of the partial check sum computed for the data stored in memory module 14A by logically combining, with the use of an EXCLUSIVE OR function, all of the data stored in memory module 14A, including the correction word.

In FIG. 3B, the contents of the memory module 14A are shown with the data word at address $A_1$ and the correction word at address $A_M$ changed to new values. The new correction word in memory module 14A is obtained by EXCLUSIVE ORing the previous value of the data word at address $A_1$, the new value of the data word at address $A_1$, and the value of the previous or old correction word.

More particularly, the new correction word is computed as follows:

```
  01110110   (old data word at A₁ from FIG. 3A)
⊕ 01101100   (new data word at A₁ from FIG. 3B)
  00000000   (old correction word from FIG. 3A)
  00011010   (new correction word).
```

The resulting new correction word is stored at the address $A_M$. As seen in FIGS. 3A and 3B, this new correction word results in the value of the partial check sum for memory module 14A remaining unchanged and the value of the longitudinal parity word in memory module 14N at address $N_M$ remaining valid after the new data word is written into address $A_1$. Accordingly, only the memory module 14A is changed when the data word at address $A_1$ is changed.

The computation of the new correction word can be done either manually or with the aid of an electronic computing device. In the case of Intel Circuit No. 2716 EPROM's, the chip having a data word to be changed can be reprogrammed in a conventional fashion, by first exposing the chip to ultraviolet radiation and then writing the entire contents, including the new data word and new correction word, into the chip with the use of a conventional PROM programming machine.

Finally, in FIG. 3C there is shown a new data word at memory address location $A_2$, and a new correction word at address $A_M$. Again, the partial check sum for the contents of memory module 14A and the longitudinal parity word stored at memory address location $N_M$ in memory module 14N remain valid and unchanged.

It should be apparent from the foregoing description that by providing a correction word in each memory module, other than the memory module storing the longitudinal parity word, a change can be made to specific data words in each memory module without also requiring a change in the memory module having the longitudinal parity word. The correction word in each memory module accommodates any changes made to the data words stored in that memory module, so that the bits in the longitudinal parity word can remain at the same value.

Although the presently preferred embodiment of this invention has been described, it will be understood that within the purview of this invention various changes may be made within the scope of the appended claims.

I claim:

1. In a data processing system having a plurality of memory modules, each memory module having a plurality of memory locations for storing data bits, said data processing system having a parity memory location for storing parity bits, the improvement comprising:

a correction word memory location in each of said memory modules for storing correction word bits in each of said modules, the parity bits stored in said parity memory location being computed by logically combining said correction word bits with the data bits stored in said memory modules, so that a change in the data bits stored in one of said memory modules can be accompanied by a change in the correction word bits stored in that one memory module so as not to require a change in the parity bits stored in said parity memory location.

2. A data processing memory system with a longitudinal parity arrangement, comprising:

a plurality of memory modules, each memory module having a plurality of addressable memory locations for storing a data word or the like, at each of said addressable memory locations each data word being comprised of bits;

a longitudinal parity word stored in a memory location in one of said modules; and a correction word stored in a memory location in each memory module other than the one memory module storing said longitudinal parity word, said parity word being computed by logically combining bits of the data words and the correction words stored in said memory modules, and said correction word being changeable each time a data word in its memory module is changed so that the value of said longitudinal parity word can remain at a constant value representing the logical combination of the data words and the correction words even when one of the data words is changed.

3. The system of claim 2, wherein each of said memory modules is a read-only memory.

4. The system of claim 2, further comprising a microprocessor, and wherein the data words stored in said memory modules provide control routines for controlling the operation of said microprocessor.

5. The system of claim 4, wherein said microprocessor is a peripheral control processor, wherein said peripheral control processor comprises an input/output random access memory for receiving macrocommands from a central system for specifying the operation of a peripheral device, and wherein said microprocessor is controlled by said memory modules in order to store primitive commands in said input/output random access memory for controlling said peripheral device to operate in accordance with the macrocommands.

6. The system of claim 4, wherein said microprocessor is operated in accordance with a diagnostic routine that causes the data words in said memory modules to be read, a check sum to be computed from the read data, and a comparison made of the check sum with said longitudinal parity word.

7. The system of claim 2, wherein said correction word is comprised of a plurality of bits, with each bit having an initial value of binary zero, and wherein bits of said correction word are changed to a new value each time a data word is changed, by logically combining the value of the data word before the change, the value of the data word after the change, and the prior value of the correction word.

8. The system of claim 7, wherein the new value of the correction word is obtained by EXCLUSIVE ORing corresponding bits of the data word before the change, the data word after the change, and the prior correction word.

9. A method for maintaining a correct longitudinal parity word in a memory system when data words in said memory system are changed, said memory system having a plurality of memory modules comprising a first module and one or more second modules, said method comprising:

providing a memory location in said first module for storing the longitudinal parity word;

providing a memory location in each said second module for storing a correction word that is combined with the data words in that second memory module to determine the value of the parity word;

initially setting each correction word at a value; and changing the value of each correction word when a data word in its memory module is changed, said correction word having a changed value computed by logically combining corresponding bits of the data word before the change, the data word after the change, and the correction word at its value prior to changing.

* * * * *